United States Patent
Paxton et al.

(10) Patent No.: US 10,239,480 B2
(45) Date of Patent: Mar. 26, 2019

(54) DISPLACEABLE STEERING WHEEL SAFETY SYSTEMS AND RELATED METHODS

(71) Applicant: Autoliv ASP, Inc., Ogden, UT (US)

(72) Inventors: Donald James Paxton, Romeo, MI (US); Dino Anthony Forton, Chesterfield, MI (US); Chandrakanth Siddharthan, Troy, MI (US); David Keyser, Orion, MI (US); Dion Karl-Axel Kruse, Alingsas (SE)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 16/005,414

(22) Filed: Jun. 11, 2018

(65) Prior Publication Data

US 2018/0290614 A1     Oct. 11, 2018

Related U.S. Application Data

(63) Continuation of application No. 15/156,636, filed on May 17, 2016, now Pat. No. 9,994,178.

(51) Int. Cl.
| | | |
|---|---|---|
| *B60R 21/01* | (2006.01) | |
| *B60R 21/203* | (2006.01) | |
| *B60R 21/0136* | (2006.01) | |
| *B60R 21/264* | (2006.01) | |
| *B60R 21/217* | (2011.01) | |
| *B62D 1/10* | (2006.01) | |
| *F15B 15/19* | (2006.01) | |
| *B62D 1/19* | (2006.01) | |

(52) U.S. Cl.
CPC ........ *B60R 21/0136* (2013.01); *B60R 21/203* (2013.01); *B62D 1/10* (2013.01); *B62D 1/197* (2013.01); *F15B 15/19* (2013.01); *B60R 21/264* (2013.01); *B60R 2021/01252* (2013.01); *B60R 2021/2173* (2013.01)

(58) Field of Classification Search
None
See application file for complete search history.

(56) References Cited

U.S. PATENT DOCUMENTS

| | | | | |
|---|---|---|---|---|
| 4,449,419 | A * | 5/1984 | Soler Bruguera ..... | B62D 1/184 280/775 |
| 5,295,712 | A * | 3/1994 | Omura .................. | B60R 21/203 280/731 |
| 5,507,521 | A * | 4/1996 | Steffens, Jr. .......... | B60R 21/203 180/282 |
| 5,871,233 | A * | 2/1999 | Tanaka .................. | B62D 1/184 280/777 |

(Continued)

*Primary Examiner* — Navid Ziaeianmehdizadeh
(74) *Attorney, Agent, or Firm* — Matthew D. Thayne; Thayne and Davis LLC

(57) ABSTRACT

Apparatus, methods, and systems for repositioning a steering wheel and/or airbag cushion prior to and/or during deployment of the airbag cushion resulting from an impact event. Some embodiments may comprise a steering wheel configured to be positioned between a first, operational configuration and a second, deployed configuration at least in part by a translational movement of the steering wheel. An airbag cushion may be deployable from the steering wheel and may be configured to move from the first configuration to the second configuration before or during deployment of the airbag cushion.

21 Claims, 10 Drawing Sheets

(56) References Cited

U.S. PATENT DOCUMENTS

| | | | |
|---|---|---|---|
| 6,227,571 B1* | 5/2001 | Sheng | B62D 1/197 280/731 |
| 6,530,596 B2* | 3/2003 | Sinnhuber | B60R 21/2032 280/731 |
| 6,578,872 B2* | 6/2003 | Duval | B62D 1/195 280/777 |
| 6,685,224 B2* | 2/2004 | Pardonnet | B62D 1/18 280/775 |
| 7,204,511 B2* | 4/2007 | Mori | B60R 21/203 280/731 |
| 7,347,451 B2* | 3/2008 | Riefe | B62D 1/184 280/775 |
| 7,621,562 B2* | 11/2009 | Longo | B62D 1/187 280/775 |
| 7,862,079 B2* | 1/2011 | Fukawatase | B60R 21/2032 280/731 |
| 7,862,084 B2* | 1/2011 | Maeda | B60K 37/00 180/402 |
| 7,905,518 B2* | 3/2011 | Geibel | B62D 1/192 280/777 |
| 8,056,925 B2* | 11/2011 | Fukawatase | B60R 21/2032 280/728.2 |
| 9,452,725 B2* | 9/2016 | Lorenz | B60R 21/0134 |
| 9,550,514 B2* | 1/2017 | Schulz | B62D 1/183 |
| 9,828,016 B2* | 11/2017 | Lubischer | B60R 21/203 |
| 2002/0089160 A1* | 7/2002 | Mendis | B62D 1/181 280/777 |
| 2005/0283288 A1* | 12/2005 | Howell | B62D 1/18 701/41 |
| 2007/0029771 A1* | 2/2007 | Haglund | B62D 1/181 280/775 |
| 2013/0087006 A1* | 4/2013 | Ohtsubo | B60R 13/02 74/493 |
| 2013/0122359 A1* | 5/2013 | Sato | H01M 4/13 429/188 |
| 2013/0233117 A1* | 9/2013 | Read | B62D 1/181 74/493 |
| 2014/0028008 A1* | 1/2014 | Stadler | B62D 1/192 280/777 |
| 2017/0008475 A1* | 1/2017 | Kruse | B60R 21/0173 |

\* cited by examiner

DISPLACEABLE STEERING WHEEL SAFETY SYSTEMS AND RELATED METHODS

CROSS-REFERENCE TO RELATED APPLICATIONS

This is a continuation of application Ser. No. 15/156,636, which was filed on May 17, 2016 and titled "DISPLACEABLE STEERING WHEEL SAFETY SYSTEMS AND RELATED METHODS," which application is hereby incorporated herein by reference in its entirety.

SUMMARY

Injuries associated with oblique load vehicle impacts are often difficult to mitigate, even using current airbag systems. For example, during such impacts, chest and/or head injuries often occur due to an occupant rolling or sliding off of the airbag cushion, and seatbelt systems may not be capable of providing sufficient restraint to prevent such injuries.

The present inventors have therefore determined that it would be desirable to provide systems and methods that overcome one or more of the foregoing limitations and/or other limitations of the prior art. For example, the present inventors have determined that, by providing, in some embodiments, safety systems that may operate in conjunction with an airbag system to move the position of the steering wheel and/or another structure from which an airbag cushion exits to account for the direction of the impact, the ability of the airbag cushion to prevent injuries, particularly for oblique impacts, may be improved.

Thus, in some embodiments and implementations, an airbag cushion may be repositioned prior to and/or during deployment of the airbag cushion resulting from an impact event. In preferred embodiments and implementations, the airbag cushion may be repositioned by displacing the steering wheel of a vehicle, which may house the airbag cushion. In some such embodiments and implementations, the direction and/or distance of the displacement may be determined by evaluating the position, angle, force, and/or other characteristics of the impact. In some embodiments, the angle of the steering wheel or other airbag cushion housing may also, or alternatively, be altered due to the impact event. The degree of such tilting may be determined based upon the impact characteristics in some embodiments.

In a more particular example of a vehicle safety system according to some embodiments, the system may comprise a first sensor, such as an accelerometer, configured to detect at least a first directional component of an impact with a vehicle, such as a lateral directional component of the impact, and a steering wheel actuator configured to move a vehicle steering wheel laterally in a direction opposite from the lateral directional component of the impact in response to a signal from at least the first sensor. An airbag cushion may be provided that may be configured to be positioned, following deployment, in a location corresponding with lateral movement caused by the steering wheel actuator.

Some embodiments may comprise a second sensor configured to detect a second directional component of the impact with the vehicle. In some such embodiments, the first sensor may be oriented at a first angle, and the second sensor may be oriented at a second angle offset from the first angle. In some such embodiments, the first angle may be offset from the second angle by about 90 degrees.

In some embodiments, the steering wheel actuator may be further configured to tilt the vehicle steering wheel in response to the signal from at least the first sensor. In some such embodiments, the steering wheel actuator may further be configured to tilt the vehicle steering wheel laterally in a direction corresponding with the direction of the impact in response to the signal from at least the first sensor.

In a specific example of a vehicle according to some embodiments, the vehicle may comprise a steering wheel, an airbag cushion configured to deploy in a location corresponding with a location of the steering wheel, and a vehicle safety system. The vehicle safety system may comprise a sensor configured to detect an impact with the vehicle, a steering wheel actuator configured to move the steering wheel laterally in response to detection of the impact, and an airbag cushion configured to be positioned, following deployment, in a location corresponding with lateral movement caused by the steering wheel actuator.

In some embodiments, the sensor may be configured to determine an angle of the impact. In some embodiments, this may be derived from a lateral component of the impact, which may also be determined from the sensor and/or other sensors.

Some embodiments may further comprise a vehicle computer system, which may be configured to receive a signal from the sensor and, upon detecting a predetermined characteristic of the impact (such as a threshold lateral component of the impact event), transmit a signal to the steering wheel actuator to move the vehicle steering wheel laterally. The vehicle computer system may further be configured to calculate a desired lateral movement distance for the steering wheel. The steering wheel actuator may be configured to move the steering wheel laterally in response to detection of the impact by a distance corresponding to the desired lateral movement distance.

In some embodiments, the steering wheel actuator may be configured to move the steering wheel in a direction opposite from a lateral component of the impact.

In an example of a method for adjusting the position of an airbag cushion during a vehicle impact event according to some implementations, the method may comprise sampling a sensor to determine a lateral component of the impact event; determining a lateral movement direction using the lateral component of the impact event; transmitting a signal to an actuator, wherein the signal comprises the lateral movement direction; and moving an airbag cushion housing in a lateral direction corresponding with the determined lateral movement direction.

Some implementations may further comprise determining whether the lateral component of the impact event exceeds a predetermined threshold.

In some implementations, the step of sampling a sensor to determine a lateral component of the impact event may comprise sampling a first sensor to determine an x-component of the impact event and sampling a second sensor to determine a y-component of the impact event. In some such implementations, the x-component is offset from the y-component by ninety degrees, or at least about ninety degrees.

Some implementations may further comprise calculating a desired lateral movement distance using the lateral component of the impact event.

In some implementations, the signal transmitted to the actuator may further comprise the desired lateral movement distance.

In some implementations, the airbag cushion housing may be positioned in a steering wheel, and the actuator may comprise a steering wheel actuator. Some such implementations may further comprise tilting the steering wheel in a lateral direction opposite from the determined lateral movement direction. In some such implementations, a tilt angle may be calculated, and the step of tilting the steering wheel may comprise tilting the steering wheel at the tilt angle.

In another specific example of a vehicle safety system according to some embodiments, the system may comprise a steering wheel configured to be positioned between a first, operational configuration and a second, deployed configuration, wherein in the second configuration the steering wheel is positioned laterally relative to the first configuration, and wherein the steering wheel is configured to be repositioned between the first configuration and the second configuration; and a steering wheel actuator configured to move the steering wheel laterally from the first configuration to the second configuration.

In some embodiments, the steering wheel actuator may comprise at least one of a spring, a piston, and a plurality of gears. In some embodiments in which the steering wheel actuator comprises a spring, the steering wheel actuator may further comprise an initiator, such as a pyrotechnic release mechanism. The initiator may be configured to retain the spring in a compressed configuration and, upon actuation of the initiator, release the spring. Upon release of the spring, the spring may be configured to reposition the steering wheel from the first configuration to the second configuration.

In some embodiments, the steering wheel actuator may comprise a piston; and a pyrotechnic device coupled with the piston such that, upon deployment of the pyrotechnic device, the piston forces the steering wheel from the first configuration to the second configuration. In some such embodiments, the system may be configured such that, upon deployment of the pyrotechnic device, the piston is further configured to decouple the steering wheel from a steering column shaft. Some embodiments may further comprise a steering wheel shaft; and a connector configured to couple the steering wheel shaft to a steering column shaft, wherein, upon deployment of the pyrotechnic device, the piston is configured to decouple the steering wheel shaft from the steering column shaft prior to forcing the steering wheel from the first configuration to the second configuration.

In some embodiments, the system may be configured such that the steering wheel is operably coupled to wheels of a vehicle in both the first and second configurations.

In another specific example of a vehicle safety system according to some embodiments, the system may comprise a steering wheel and an airbag cushion coupled with the steering wheel. The system may further comprise means for laterally displacing the airbag cushion, such as means for laterally displacing the steering wheel, along with means for deploying the means for laterally displacing the airbag cushion, such as a pyrotechnic or other initiator.

In some embodiments, the means for laterally displacing the steering wheel may comprise a spring; and a pyrotechnic release mechanism, wherein the pyrotechnic release mechanism is configured to retain the spring in a compressed configuration and, upon actuation of the pyrotechnic release mechanism, release the spring, and wherein, upon release of the spring, the spring is configured to laterally displace the steering wheel. In some such embodiments, the means for laterally displacing the steering wheel may further comprise a pilot gear; and a steering wheel shaft gear coupled with the pilot gear, wherein, upon actuation of the pyrotechnic release mechanism, the spring is configured to disengage the steering wheel shaft gear from the pilot gear.

In some embodiments, the means for laterally displacing the steering wheel may comprise a piston; and a pyrotechnic device coupled with the piston such that, upon deployment of the pyrotechnic device, the piston forces the steering wheel in a lateral direction. Some embodiments may further comprise a steering wheel shaft. In some such embodiments, the piston may be configured to decouple the steering wheel shaft from a steering column shaft of a vehicle.

Some embodiments may further comprise a connector for coupling the steering wheel shaft to the steering column shaft. In some such embodiments, the piston may comprise a forked ramp structure configured to decouple the steering wheel shaft from a steering column shaft.

Some embodiments may further comprise one or more sensors. Such sensor(s) may be configured to detect a predetermined characteristic of an impact event, such as a threshold lateral component of the impact event, and, upon detecting the predetermined characteristic of the impact event, transmit a signal to laterally displace the airbag cushion.

In another example of a vehicle safety system according to some embodiments, the system may comprise a steering wheel actuator configured to be coupled with a vehicle steering wheel, wherein, upon being coupled with the steering wheel, the steering wheel actuator is configured to reposition the vehicle steering wheel between a first operational configuration and a second, deployed configuration, wherein in the second configuration the steering wheel is positioned laterally relative to the first configuration. The actuator may comprise, for example, one or more springs, pistons, and/or gears. The system may further comprise an initiator, such as a pyrotechnic initiator, coupled to the steering wheel actuator configured to receive a signal and, upon receipt of the signal, initiate the steering wheel actuator such that the vehicle steering wheel is repositioned from the first configuration to the second configuration.

In some embodiments, the initiator may be configured to initiate the steering wheel actuator upon receipt of a signal indicating the occurrence of an oblique impact event.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to repositioning of an airbag cushion prior to and/or during deployment of the airbag cushion resulting from an impact event. In preferred embodiments and implementations, the airbag cushion may be repositioned by displacing the steering wheel of a vehicle, which may house the airbag cushion. In some such embodiments and implementations, the direction and/or distance of the displacement may be determined by evaluating the position, angle, force, and/or other characteristics of the impact. In some embodiments, the angle of the steering wheel or other airbag cushion housing may also, or alternatively, be altered due to the impact event. The degree of such tilting may be determined based upon the impact characteristics in some embodiments.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
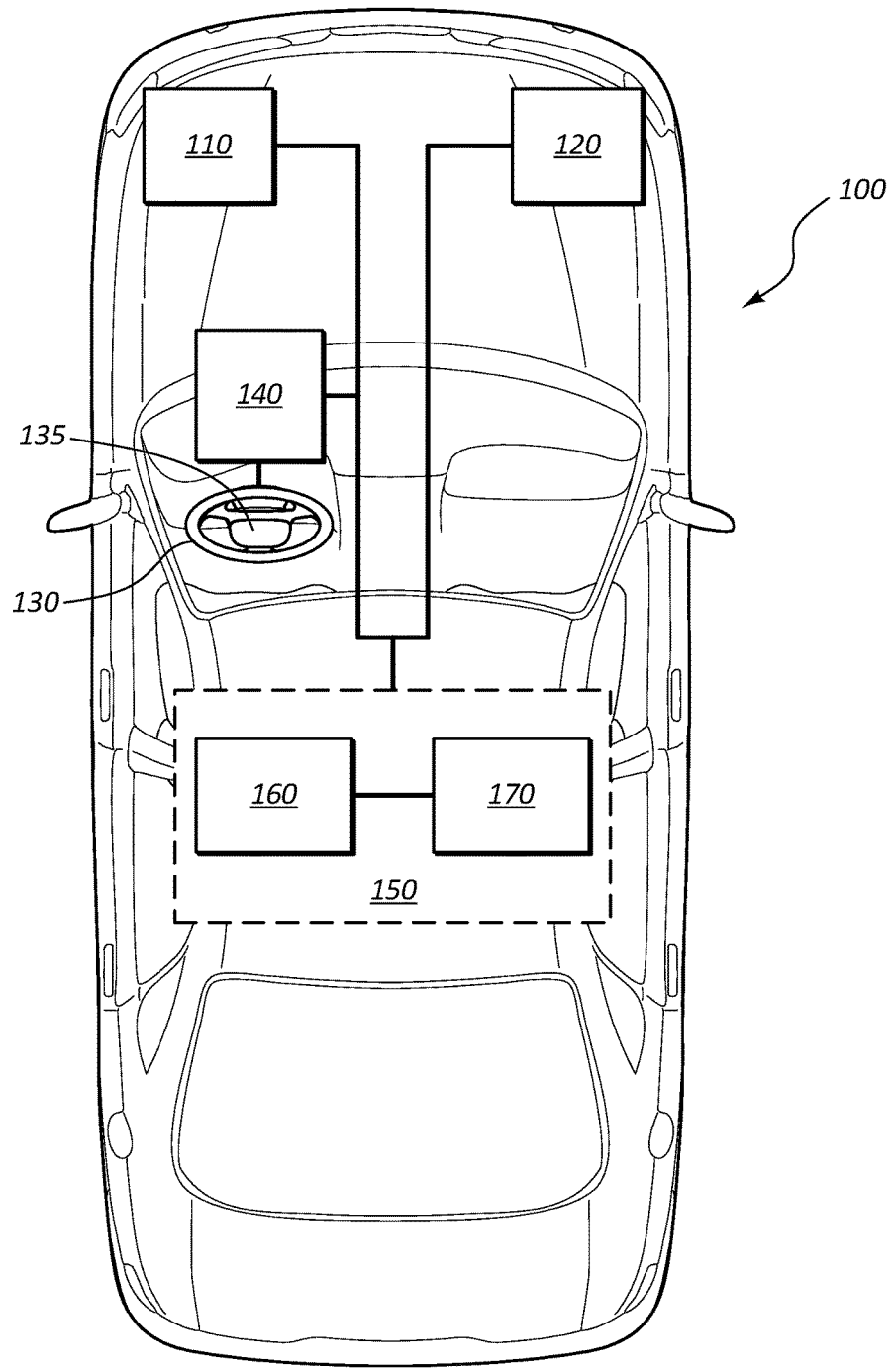
FIG. 1 is a schematic diagram illustrating a vehicle comprising a vehicle safety system having an airbag cushion and a means for moving the airbag cushion laterally according to one embodiment.

FIG. 1 depicts a vehicle 100 comprising a first sensor 110 and a second sensor 120. Sensors 110 and 120 may be configured to detect and/or predict various characteristics of a vehicle impact event, such as the direction of the impact angle relative to, for example, the airbag cushion or some other fixed point on the vehicle 100. Sensors 110 and 120 may comprise, for example, accelerometers or other suitable sensors, such as pressure sensors, sound sensors, vibration sensors, and the like. In some embodiments, first sensor 110 may comprise a first sensing axis and second sensor 120 may comprise a second sensing axis offset from the first sensing axis. In some such embodiments, the first sensing axis may be offset from the second sensing axis by ninety degrees, or at least about ninety degrees.

For example, in some embodiments, first sensor 110 may be aligned with a lateral or "x" axis direction and second sensor 120 may be aligned with a forward or "y" axis direction. By comparing signals from sensors 110 and 120, a direction of the impact may be determined. Of course, other characteristics of the impact, such as the intensity or force associated with the impact, may be obtained by sensors 110, 120, and/or other sensors. In some embodiments, pre-crash sensors, such as, for example, cameras, radar, and/or lasers, may be provided as well. Other embodiments are contemplated in which a single sensor or set of sensors may be provided.

Vehicle 100 further comprises a steering wheel 130 comprising an airbag cushion housing 135. Although preferred embodiments disclosed herein may be particularly useful for driver side airbag systems, and therefore may be used in connection with airbag systems configured to be deployed from a steering wheel 130, other embodiments are contemplated in which the airbag cushion housing may be positioned in or on another portion of the vehicle 100.

An airbag cushion housing actuator, such as a steering wheel actuator 140, may be coupled with airbag cushion housing 135 and/or steering wheel 130. Actuator 140 may comprise, for example, ball screws, guide rails, linear actuators, rack and pinion devices, motors, gears, etc. In some embodiments, actuator 140 may comprise a pyrotechnic component, which may be used to provide sufficient force within a sufficiently small time window to reposition the airbag cushion prior to and/or during the impact event. In some such embodiments, the pyrotechnic actuator may comprise, for example, a pneumatic air cylinder with a push rod and a piston, which may be configured to direct the steering wheel 130 and/or airbag cushion housing 135 laterally along a rail system. In some embodiments, the same pyrotechnic device may be used to both deploy the airbag cushion and provide force sufficient to reposition the steering wheel 130/airbag cushion housing 135.

In some embodiments, a computer system 150 may be used to coordinate the various signals involved in detecting the impact event and/or actuating the actuator 140. In some embodiments, computer system 150 may comprise electronics 160 and memory 170. Electronics 160 may comprise, for example, one or more processors, communications interfaces, and the like, as those of ordinary skill in the art will appreciate. Memory 170 may comprise random access memory (RAM) and/or a non-transitory computer-readable storage medium. In some embodiments, memory 170 may be programmable or otherwise manipulable by a technician or user to, for example, input one or more variables to alter the operation of the safety system. For example, in some embodiments, a user may alter the desired stroke distance of actuator 140 or otherwise alter the desired deployment characteristics of actuator 140 in accordance with, for example, the vehicle occupant's height, weight, and/or preferences.

In some embodiments, one or more parameters of the system, such as a stroke distance of actuator 140 and/or a tilt angle of steering wheel 130, may be associated with particular characteristics of the impact, such as a lateral component of the impact angle. In such embodiments, a look-up table or the like may be used to quickly associate the distance, angle, etc., with the impact characteristic. In other embodiments, more complicated calculations may be performed in real time during the impact and the parameters of the safety system may be adjusted in real time accordingly.

In some embodiments, computer system 150 may be a pre-existing computer system of vehicle 100. Alternatively, computer system 150 may be specifically part of a safety system for displacing an airbag cushion during or prior to an impact event. In some such embodiments, computer system 150 may be configured to interface with the existing vehicle computer system. The various components of the computer system 150 may be implemented using hardware, software, firmware, and/or any combination thereof.

Figure 2:
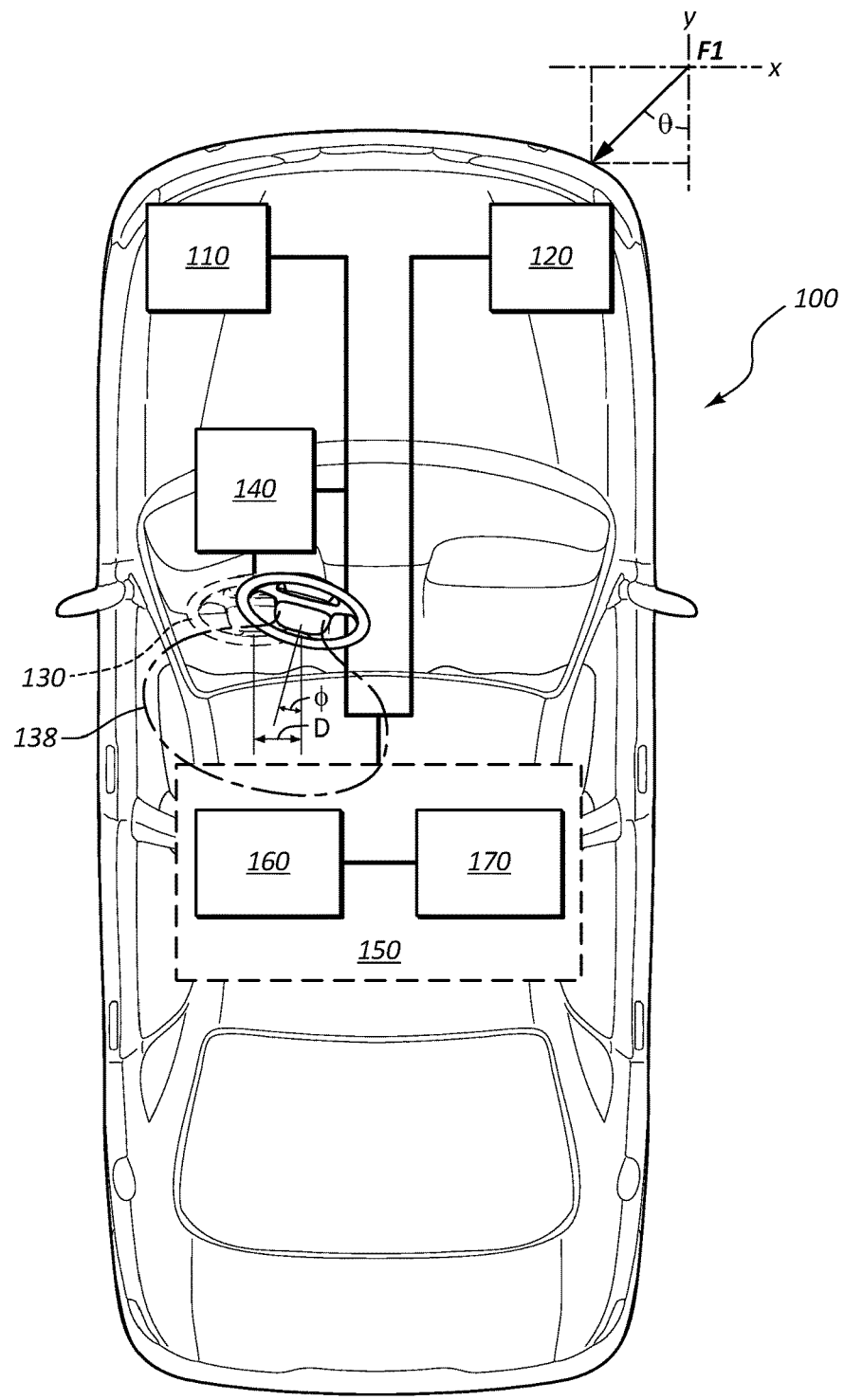
FIG. 2 is a schematic diagram illustrating the vehicle of FIG. 1 during an oblique impact event involving a lateral component.

FIG. 2 depicts vehicle 100 after undergoing an oblique impact event F1 from the right side of the vehicle. As shown in this figure, the impact event has an impact angle of e degrees relative to a head-on impact, which would have an impact angle of zero degrees. Impact may be made up of an x-component or lateral component and a y-component or forward component, as indicated in the figure. In some embodiments, one of the sensors 110/120 may be configured to sense the x-component of the impact and the other of the sensor 110/120 may be configured to sense the y-component of the impact.

Upon detecting the angle and/or other characteristics of the impact, a signal may be sent to actuator 140, which may result in movement of steering wheel 130 and/or airbag cushion housing 135. In some embodiments, as previously mentioned, signals may be continuously sent during the impact so that adjustments to actuator 140 may be made in real time. In preferred embodiments, actuator 140 may be configured to move steering wheel 130 and/or airbag cushion housing 135 laterally relative to the occupant in a direction opposite from the direction of the lateral component of the impact. In other words, because the impact in FIG. 2 was directed from right to left (from the perspective of the figure), actuator 140 has moved steering wheel 130, and thereby moved airbag cushion housing 135, in a direction from left to right. More particularly, actuator 140 has moved steering wheel 130 laterally to the right by a distance "D."

In some embodiments, distance D may be between about 25 mm and about 150 mm. Distance D may, in some embodiments, be based on the ratio between the calculated impact angle (ratio y/x, for example) and/or the distance between the driver/occupant and the airbag/steering wheel, which may be based on occupant size, seat position, etc. For example, for a common impact angle (y/x) of 15-25 degrees, the occupant distance to an inflated airbag cushion may be between about 100 mm and about 300 mm. For a 15 degree impact angle, distance D may be about 27 mm for an occupant positioned at a distance of 100 mm from the airbag cushion and about 80 mm for an occupant positioned about 300 mm from the airbag cushion. Distance D for occupant distances from the airbag between 100 mm and 300 mm may vary linearly in accordance with the occupant/airbag distance between 27 and 80 mm.

As another example, for an impact angle of 25 degrees, distance D may be about 47 mm for an occupant positioned at a distance of 100 mm from the airbag cushion and about 140 mm for an occupant positioned about 300 mm from the airbag cushion. Distance D for occupant distances from the airbag between 100 mm and 300 mm may vary linearly in accordance with the occupant/airbag distance between 47 and 140 mm. Of course, not all embodiments must be so precise. Thus, some embodiments, may comprise a plurality of "steps" or preconfigured thresholds and distance D, and/or other parameters of the safety system, may vary between such thresholds depending upon the characteristics of the impact and/or positioning/features of the occupant.

In the depicted embodiment, an airbag cushion 138 has been deployed from steering wheel 130. Because steering wheel 130 has been moved laterally in a direction opposite from the lateral component of the impact, airbag cushion 138 is in a better position to protect the occupant (the driver in the depicted embodiment) from certain common problematic aspects of oblique-angle impacts, such as occupant roll-offs or slide-offs. Moreover, the airbag cushion 138 will be in a better position to receive the occupant's head in a more central location within airbag cushion 138.

In some embodiments, actuator 140, or a different actuator, may also, or alternatively, be configured to tilt the steering wheel 130 and/or the airbag cushion housing 135. Again, preferably this tilting is done to position the airbag cushion 138 in a better position to absorb impact forces from oblique-angle impacts. Thus, with respect to the impact depicted in FIG. 2, because the impact has a lateral component directed towards the left, actuator 140 is configured to tilt steering wheel 130 in a lateral direction opposite from the lateral movement direction of steering wheel 130. In other words, whereas the steering wheel 130 is moved to the right, it is tilted to the left by an angle ϕ).

Figure 3:
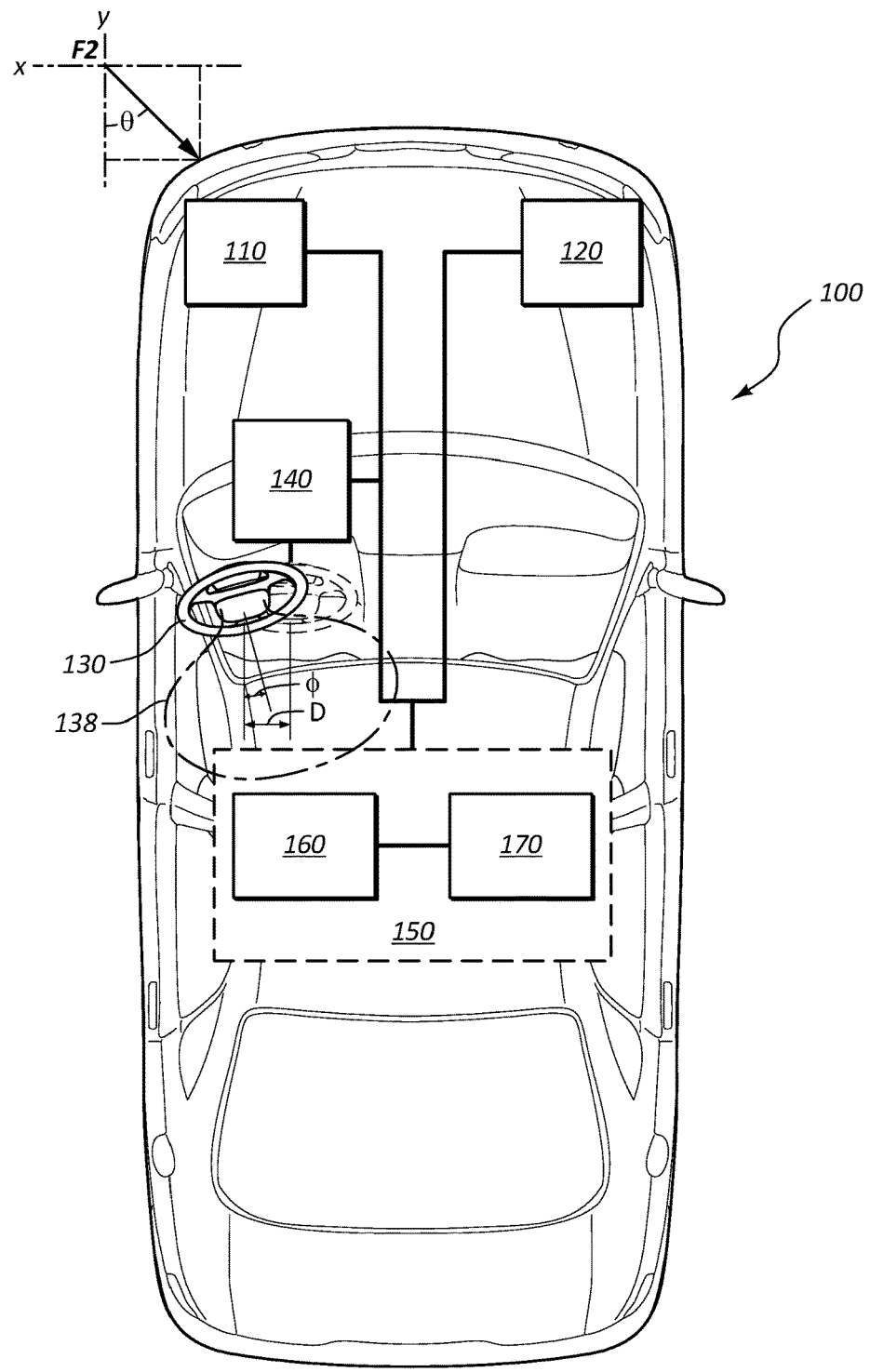
FIG. 3 is a schematic diagram illustrating the vehicle of FIG. 1 during another oblique impact event involving a lateral component opposite from the lateral component of the impact event of FIG. 2.

FIG. 3 depicts vehicle 100 upon undergoing another oblique impact event F2 in which the lateral component of the impact is directed in the opposite direction relative to that depicted in FIG. 2. Thus, impact event F2 has a lateral component that is directed to the right. As also shown in this figure, the impact event F2 has an impact angle of e degrees relative to a head-on impact. Because the lateral component of impact event F2 is directed to the right, actuator 140 has repositioned steering wheel 130 laterally to the left by a distance "D." In addition, steering wheel 130 has been tilted in a direction opposite from the lateral movement distance. Thus, steering wheel 130 has been laterally moved to the left and tilted to the right by an angle ϕ). Again, this position may be better suited to allow for airbag cushion 138 to prevent injury to an occupant positioned in front of airbag cushion 138 during the impact event F2.

Figure 4:
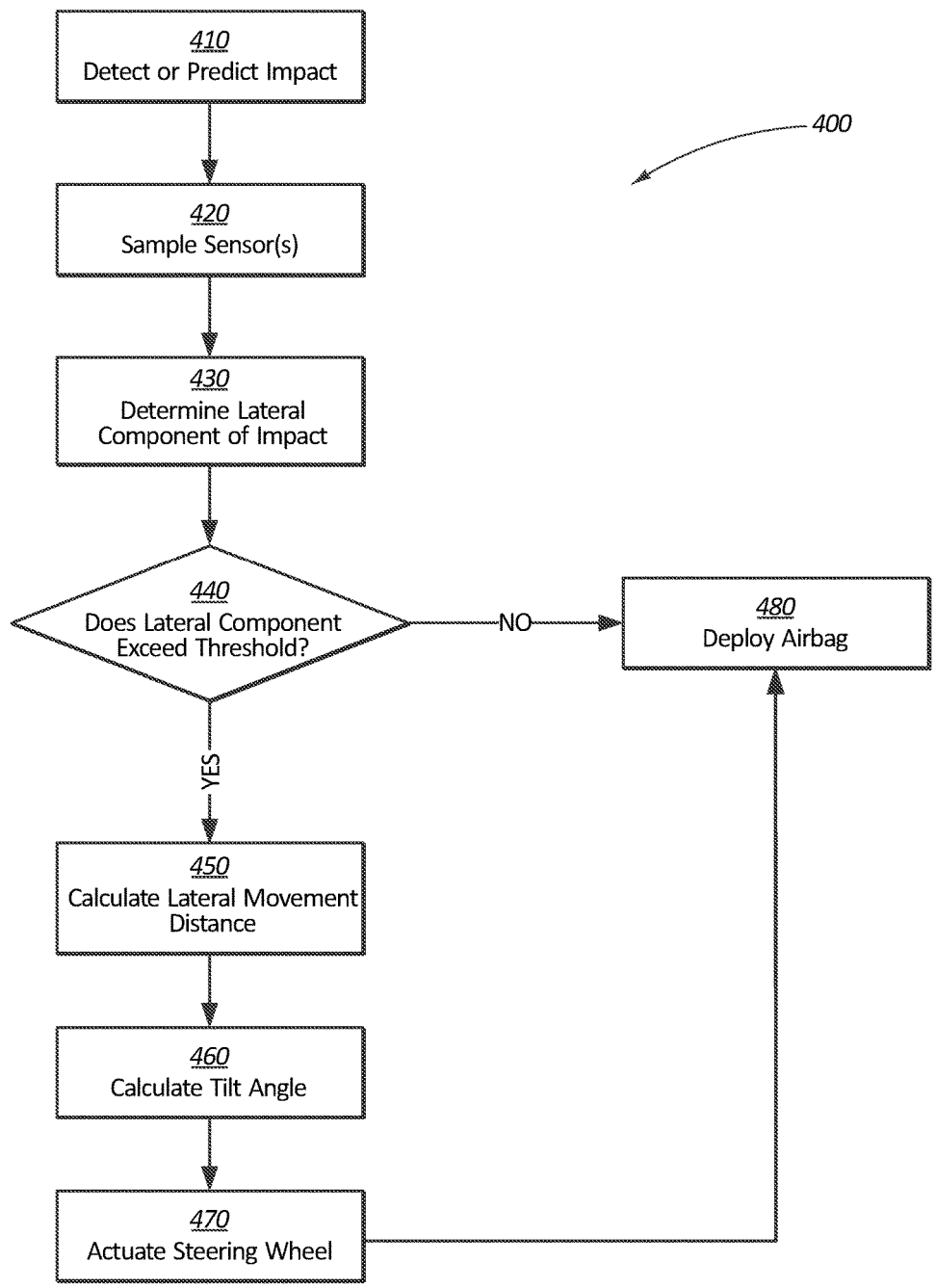
FIG. 4 is a flow chart depicting an example of a method for displacing an airbag cushion before and/or during deployment of the airbag cushion according to certain implementations.

FIG. 4 is a flow chart depicting a method 400 for displacing an airbag cushion before or during deployment of the cushion according to certain implementations. At step 410, an impact event is either detected or predicted. In some implementations, this step may comprise use of one or more sensors, such as sensors 110 and 120 from FIGS. 1-3. In implementations in which an impact is predicted, pre-crash sensors, such as cameras, radar, and/or lasers, may be used.

Step 420 may comprise sampling one or more sensors to assess characteristics of the impact. In some implementations, step 420 may comprise use of the same sensors, or at least a subset of the same sensors, used in step 410. In some implementations, steps 410 and 420 may be combined into a single step. In other words, the impact may be detected by sampling the sensor(s) in some implementations.

Step 430 comprises determining a lateral component of the impact. Thus, for example, in some implementations one or more signals from the sensor(s) may be transmitted to a computer system, such as computer system 150, which may be used to assess or compute a lateral component of the impact.

Following step 430, in some implementations, the lateral component of the impact (or an impact angle and/or impact force/severity) may be compared with a threshold to determine whether to move the airbag cushion at step 440. For example, in some implementations, the threshold for activating movement of the airbag cushion may be the same as the trigger for deploying the airbag cushion. In other implementations, the system may be reversible. In other words, the steering wheel/airbag cushion movement may be triggered prior to deployment of the airbag cushion. In some such implementations, this triggering may be based on predicted, pre-crash sensors.

Thus, in some implementations and embodiments, the actuator, such as actuator 140, may be configured to move the steering wheel and/or airbag upon detection of any impact event, or an impact event of sufficient force. If the impact event is also sufficient to trigger deployment of the airbag cushion, the cushion will then be in a better position to absorb the impact for the occupant. If, on the other hand, the impact event fails to trigger the airbag cushion deployment, the actuator may be configured to return the steering wheel and/or airbag module to its original position. Alternatively, the steering wheel and/or airbag module may be manually returned to its original position after such an event.

If the threshold lateral component is not met or exceeded, method 400 may proceed to step 480, at which point the airbag may be deployed. If, on the other hand, the threshold lateral component of the impact has been met or exceeded, which may indicate an oblique impact of sufficient force/severity in a lateral direction, method 400 may proceed to step 450.

Step 450 may comprise calculating a lateral movement distance. For example, in some implementations, step 450 may comprise using the lateral component of the impact determined at step 430 to determine a desired lateral movement distance of the airbag cushion (or a housing or other object, such as a steering wheel, to which the cushion is coupled). However, other implementations are contemplated in which step 450 may be omitted. In other words, a standard distance may be used for all impact events, or at least for all impact events meeting a lateral component threshold or other threshold.

Step 460 may comprise calculating a tilt angle. For implementations in which the steering wheel is moved to accomplish movement of the airbag cushion, as described above, the steering wheel may be tilted in a desired direction/angle in accordance with the lateral component of the impact. Although a particular angle may be calculated in certain implementations, which angle may correspond with the severity of the impact in a particular lateral direction and/or the lateral component of the impact, other implementations are contemplated in which a fixed tilt angle may be used for all impacts, or at least for all impacts meeting the threshold of step 440. Moreover, still other implementations are contemplated in which the steering wheel/airbag cushion may only be moved laterally and no tilting may be needed.

Following step 460, a signal may be transmitted to an actuator to laterally move and/or tilt the steering wheel or another component used to house the airbag cushion at step 470. In some implementations, the same actuator may be used to both laterally move and tilt the steering wheel/airbag cushion. In some implementations, the actuator used to deploy the airbag cushion may also be used to laterally move and/or tilt the steering wheel/airbag cushion.

Method 400 may then proceed to step 480 for deployment of the airbag cushion. As alluded to above, in some implementations, deployment of the airbag and the actuator may be simultaneous. In some implementations, the steering wheel/airbag cushion housing may be returned to its original position following deployment/actuation, either manually or automatically.

Figure 5A:
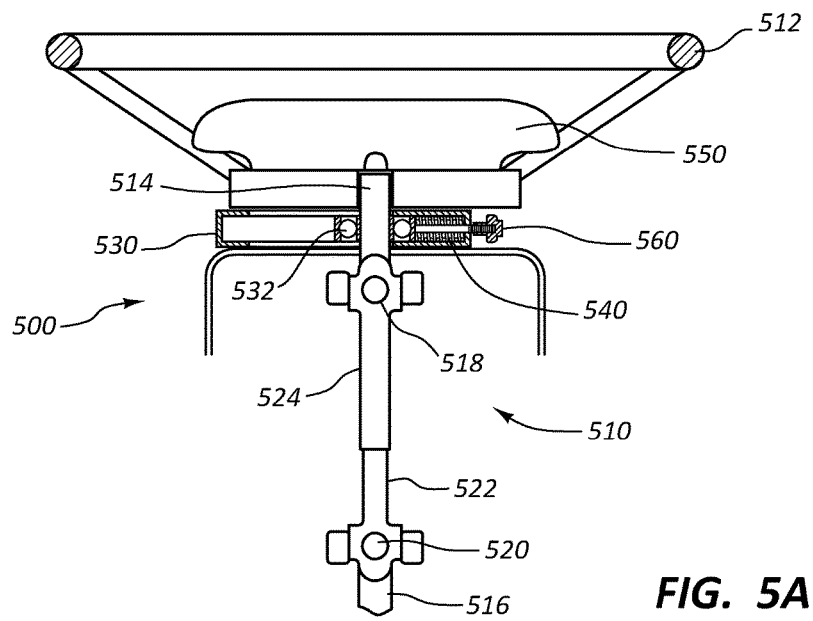
FIG. 5A is a cross-sectional view of an embodiment of a vehicle safety system comprising a steering wheel actuator for moving the steering wheel laterally prior to or during an impact event.
Figure 5B:
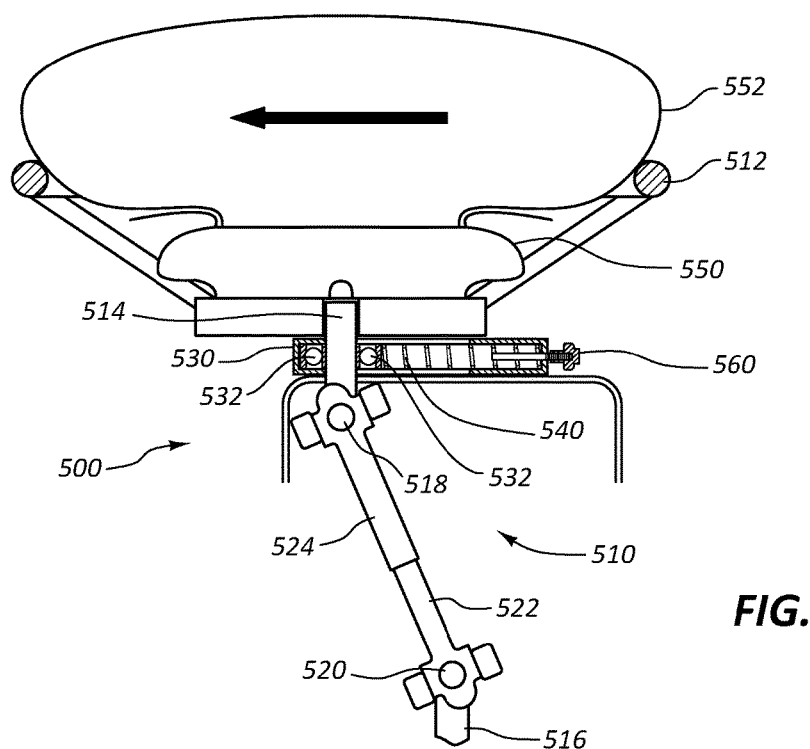
FIG. 5B is a cross-sectional view of the vehicle safety system of FIG. 5A shown following deployment of the steering wheel actuator.

FIGS. 5A and 5B depict an example of an embodiment of a vehicle safety system 500 comprising a steering wheel actuator 510 and an initiator 560 for initiating steering wheel actuator 510. Initiation of steering wheel actuator 510 results in repositioning of steering wheel 512 between a first, operational configuration and a second, deployed configuration. FIG. 5A depicts steering wheel 512 in the first configuration and FIG. 5B depicts steering wheel 512 in the second configuration. As depicted in FIG. 5B, in the second configuration, steering wheel 512 is positioned laterally relative to the first configuration. As previously discussed, in this manner, upon receipt of a signal, such as a signal indicative of an oblique angle impact event, in some embodiments an oblique angle impact event of a particular threshold force and/or lateral impact component, initiator 560 may be configured to deploy in order to cause steering wheel 512 to be repositioned from the first configuration depicted in FIG. 5A to the second configuration depicted in FIG. 5B, as indicated by the arrow in FIG. 5B.

Vehicle safety system 500 may further comprise an airbag module 550 configured to deploy an airbag cushion 552. In some embodiments, steering wheel 512 may be coupled with airbag module 550 comprising airbag cushion 552 such that repositioning of steering wheel 512 also repositions airbag cushion 552. However, other embodiments are contemplated in which vehicle safety system 500 may be configured to solely reposition airbag cushion 552 without also repositioning steering wheel 512.

As also depicted in FIGS. 5A and 5B, steering wheel actuator 510 comprises a steering wheel shaft 514 coupled with a steering column shaft 516 using a double U-joint connector. More particularly, an upper U-joint 518 allows for pivoting with respect to steering wheel shaft 514 and a lower U-joint 520 allows for pivoting with respect to steering column shaft 516. A shaft 522 of lower U-joint 518 may be slidably received, such as in a telescoping manner, within a similar shaft 524 of upper U-joint 518. The embodiment depicted in FIGS. 5A and 5B may be particularly useful in connection with vehicles already having a lower U-joint, such as many vehicles having tilting steering wheel configurations.

Of course, a variety of alternative configurations will be apparent to those of ordinary skill in the art after receiving the benefit of this disclosure. For example, shaft 524 may instead be received within shaft 522 in alternative embodiments. As another example, although U-joints 518 and 520 should be considered an example of a means for pivotably coupling a steering wheel to a steering column to allow for laterally displacing the steering wheel, other examples of such means may be used, such as universal joints, bellows couplings, CV joints, and the like.

In some such embodiments, the use of upper and lower U-joints, or another means for pivotably coupling a steering wheel to a steering column, may allow for the vehicle's steering system to remain functional following deployment of the steering wheel actuator. For example, in the embodiment depicted in FIGS. 5A and 5B, following lateral displacement of steering wheel 512 by steering wheel actuator 510, steering wheel 512 may still be functionally coupled to the vehicle's wheels such that a driver can maintain steering control of the vehicle following deployment of the steering wheel displacement system 500.

Steering wheel shaft 514 is coupled with an actuation housing 530 by positioning steering wheel shaft 514 within a bearing 532 housed and slidably received within a chamber formed within actuation housing 530. In the depicted embodiment, actuation housing 530 comprises a cylinder having a single chamber. However, alternative embodiments are contemplated in which actuation housing 530 may have a different shape and/or may comprise multiple chambers, as described below.

One or more springs, or other means for translating a steering wheel, may similarly be positioned within actuation housing 530. For example, in the depicted embodiment, a spring 540 may be housed within actuation housing 530. Spring 540 may be in a compressed state and may be retained on one side of steering wheel shaft 514.

Spring 540 may be actuated by a pyrotechnic device or another similar initiator 560. For example, in some embodiments, spring 540 may be retained in its compressed configuration by a rod extending through the center of the spring 540, which rod may be coupled with bearing 532 or another component, such as a plate, that may be positioned within actuation housing 530 and/or coupled to steering wheel shaft 514. Initiator 560 may be configured to release this rod, or may otherwise be configured to release spring 540 from its compressed configuration, upon receipt of, for example, a signal, such as a signal indicating or predicting an impact event, such as, in some embodiments, an oblique angle impact event.

Upon receipt of such a signal, or otherwise upon actuation of initiator 560, spring 540 is released, which forces steering wheel shaft 514 laterally. As illustrated in FIG. 5B, this force causes upper and lower U-joints 518 and 520, respectively, to pivot, thereby allowing steering wheel shaft 514 to move laterally while still being coupled to steering column shaft 516. In some embodiments, this may allow for continued transfer of steering forces to the wheels of the vehicle even in the post-actuation configuration shown in FIG. 5B.

Figure 8A:
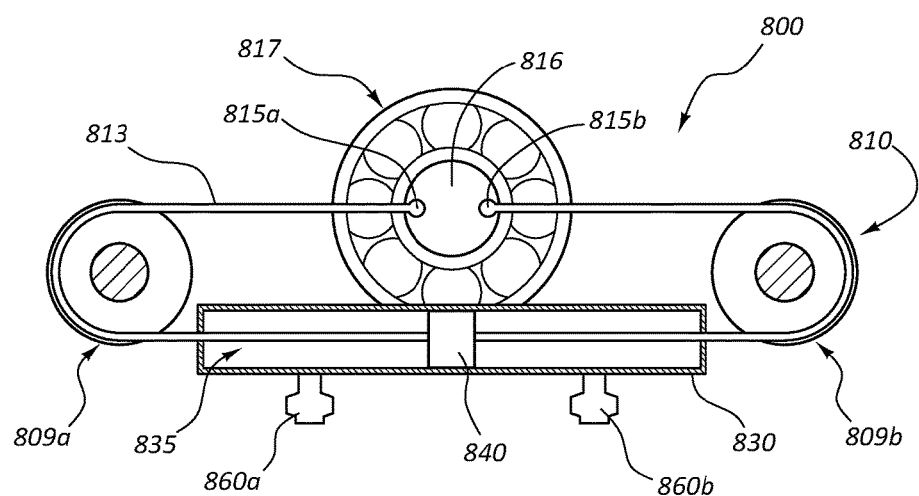
FIG. 8A is a cross-sectional view of still another embodiment of a vehicle safety system comprising a steering wheel actuator for moving the steering wheel laterally prior to or during an impact event.
Figure 8B:
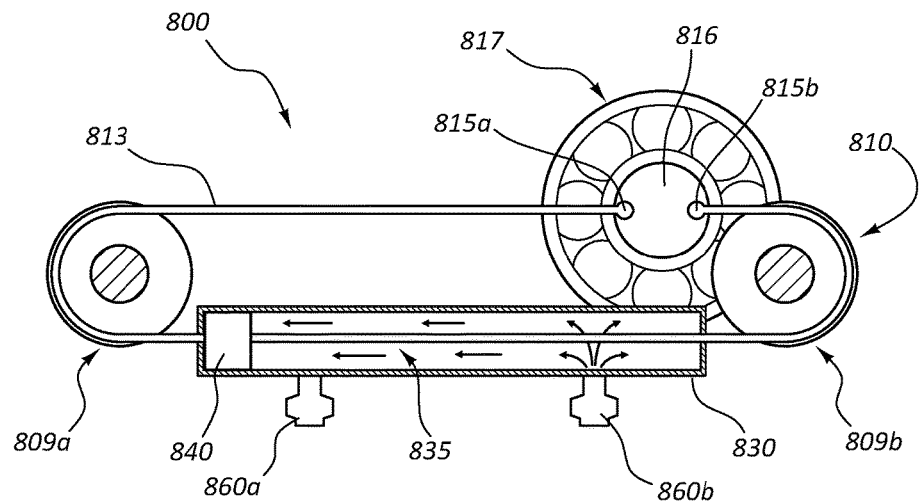
FIG. 8B is a cross-sectional view of the vehicle safety system of FIG. 8A shown following deployment.
Figure 9:
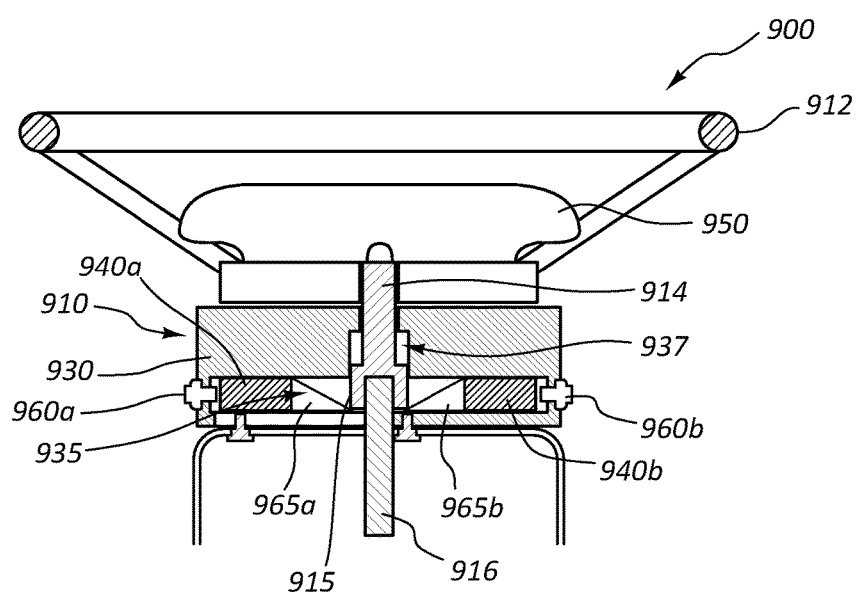
FIG. 9 is a cross-sectional view of still yet another embodiment of a vehicle safety system.

Although the embodiment depicted in FIGS. 5A and 5B shows steering wheel 512 being moved laterally to the left, other embodiments are contemplated in which steering wheel 512 may be configured to be forced to the right. In some such embodiments, steering wheel 512 may be configured to be forced either right or left depending upon the direction of the impact during a lateral impact event. For example, in some embodiments, two actuation cylinders may be used or a wider actuation cylinder having two adjacent tracks may be used. In some such embodiments, two separate springs and/or two separate initiators may be used, one on each side of steering wheel shaft 514. One or both of the springs, tracks, and/or shafts may comprise a ramp structure and/or the system may otherwise be configured, for example, such that steering wheel shaft 514 moves proximally or distally within a shaft and/or track upon release of a spring on one side so as to avoid the spring on the opposite side upon deployment. Examples of systems that are configured to be forced either right or left depending upon the direction of the impact during a lateral impact event are depicted in FIGS. 8A, 8B, and 9, and are discussed in greater detail below.

Figure 6A:
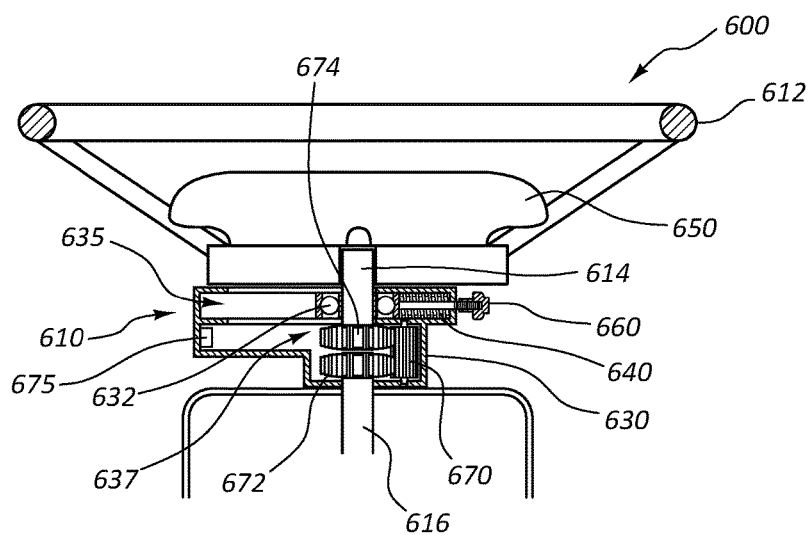
FIG. 6A is a cross-sectional view of another embodiment of a vehicle safety system comprising a steering wheel actuator for moving the steering wheel laterally prior to or during an impact event.
Figure 6B:
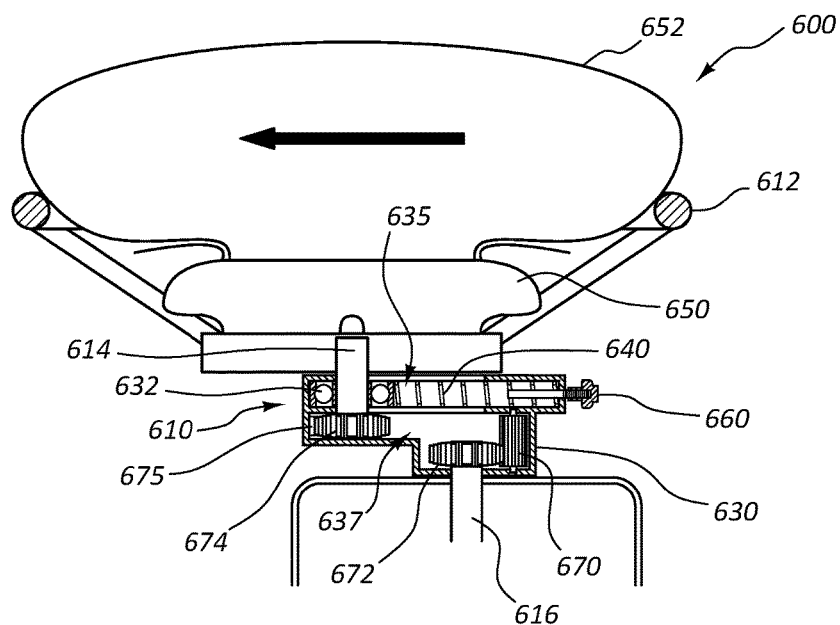
FIG. 6B is a cross-sectional view of the vehicle safety system of FIG. 6A shown following deployment of the steering wheel actuator.

FIGS. 6A and 6B depict another example of an embodiment of a vehicle safety system 600 comprising a steering wheel actuator 610 and an initiator 660 for initiating steering wheel actuator 610. Like vehicle safety system 500, initiation of steering wheel actuator 610 results in repositioning of steering wheel 612 between a first, operational configuration and a second, deployed configuration. FIG. 6A depicts steering wheel 612 in the first configuration and FIG. 6B depicts steering wheel 612 in the second configuration. Again, as depicted in FIG. 6B, in the second configuration, steering wheel 612 is positioned laterally relative to the first configuration, which may be a preferred location for deployment of airbag cushion 652 from airbag module 650 during an oblique angle impact event.

As also depicted in FIGS. 6A and 6B, steering wheel actuator 610 comprises a 765 coupled with a steering column shaft 616. However, steering wheel actuator 610 differs in several respects from steering wheel actuator 510. For example, steering wheel actuator 610 comprises an actuation housing 630 comprising multiple chambers. In addition, steering wheel actuator 610 comprises a plurality of gears that may be used to transfer torque as needed to various components in the system and/or vehicle.

More particularly, actuation housing 630 comprises two chambers, namely, a spring chamber 635 and a gear chamber 637. Spring chamber 635 may serve a similar function to the single chamber of actuation housing 530. Thus, spring chamber 635 may allow spring 640 to be housed within spring chamber 635 of actuation housing 630 in a compressed state on one side of steering wheel shaft 614. Spring 640 may similarly be actuated by a pyrotechnic device or another similar initiator 660. In some embodiments, this may take place upon receipt of such a signal by initiator 660, such as a signal indicating the presence of an oblique angle impact event, or an oblique angle impact event having specific characteristics. Once spring 640 is released, steering wheel shaft 614 is forced laterally (to the left from the perspective of FIGS. 6A and 6B), as indicated by the arrow in FIG. 6B.

In the depicted embodiment, gear chamber 637 is configured to house three separate gears that are functionally coupled with one another. More particularly, a pilot gear 670 is, in the first or operational configuration depicted in FIG. 6A, engaged with a steering column shaft gear 672. Pilot gear 670 is also engaged with a steering wheel shaft gear 674. In certain embodiments, both steering column shaft gear 672 and steering wheel shaft gear 674 have the same diameter and number of teeth such that, when pilot gear 670 is turned, steering column shaft gear 672 and steering wheel shaft gear 674 both turn at the same rate. However, alternative embodiments are contemplated in which the diameter and/or number of teeth on these gears need not match. In addition, various other types of gears may work in this configuration, such as beveled gears, angled gear teeth, spring-loaded gears, etc. In addition, differing numbers of gears may be used in various other contemplated embodiments.

In a normal, operational configuration, upon rotation of steering wheel 612, steering wheel shaft gear 674 rotates, which, in turn, causes pilot gear 670 to rotate. By virtue of its engagement with steering column shaft gear 672, rotation of pilot gear 670 results in rotation of steering column shaft 616.

However, following deployment of initiator 660, the force from release of spring 640 causes steering wheel shaft 614 to decouple from steering column shaft 616 and move laterally to reposition the steering wheel 612, and airbag cushion 652, in a more preferred location to protect against the impact event that triggered deployment of steering wheel actuator 610, whether by sensing such impact event directly or predicting it based upon use of, for example, one or more sensors, such as sensors 110 and 120. This configuration following deployment of steering wheel actuator 610 is shown in FIG. 6B. To facilitate translational movement of steering wheel shaft 614 within spring chamber 635, one or more bearings 632 may be housed and slidably received within spring chamber 635.

Although the embodiment depicted in FIGS. 6A and 6B shows steering wheel 612 being moved laterally to the left, other embodiments are contemplated in which steering wheel 612 may be configured to be forced to the right, or may be configured to be forced either right or left depending upon the direction of the impact during a lateral impact event, as mentioned above.

Some embodiments may be configured such that, following deployment of steering wheel actuator 610, steering wheel shaft 614 may be coupled with steering column shaft 616 once again. Thus, for example, snap fit male and female elements may be configured to extend from and/or be formed within mating portions of steering wheel shaft 614 and/or steering column shaft 616 to facilitate such re-coupling. Alternatively, or additionally, spring 640 may be configured to be compressed or otherwise reset such that steering wheel shaft 614 is re-aligned with steering column shaft 616 following deployment. In still other embodiments, system 600 may be configured such that steering wheel actuator 610 either cannot be reset following deployment or requires professional resetting by the vehicle manufacturer or a suitable mechanic.

In some embodiments, a gear stop 675, such as a fixed gear tooth, may be positioned within spring chamber 635 at the end of spring chamber 635 opposite from initiator 660. Gear stop 675 may be configured to prevent steering wheel 612 from being rotated in its translated configuration. This may be useful to avoid a driver attempting to use the steering wheel during an impact event because, in some embodiments, steering wheel 612 may lack functionality in this configuration due to steering wheel shaft 614 being decoupled from steering column shaft 616.

Figure 7A:
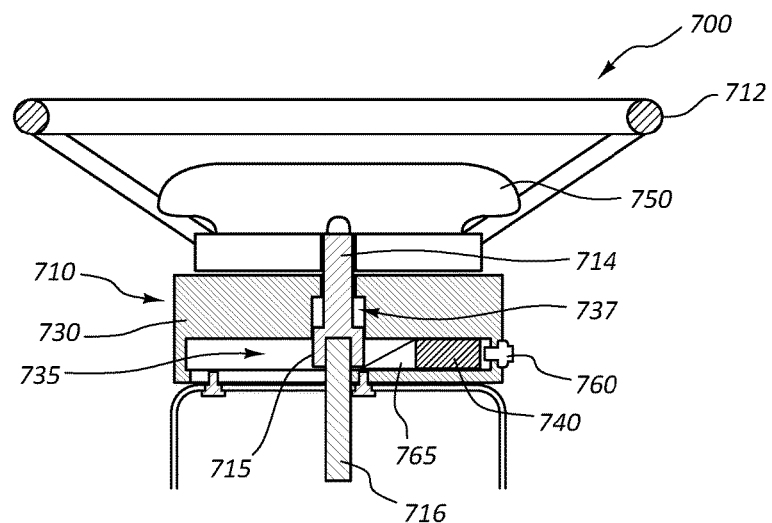
FIG. 7A is a cross-sectional view of yet another embodiment of a vehicle safety system comprising a steering wheel actuator for moving the steering wheel laterally prior to or during an impact event.
Figure 7B:
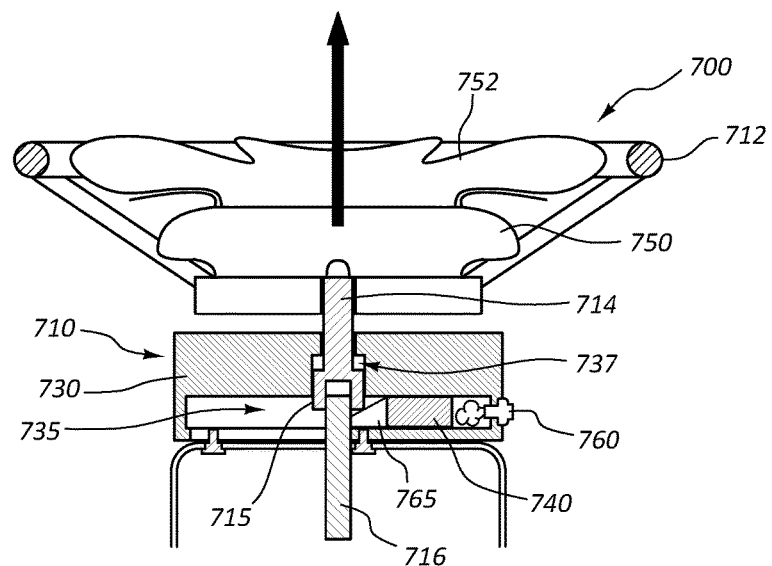
FIGS. 7B and 7C are cross-sectional views of the vehicle safety system of FIG. 7A shown during various intermediate stages of deployment of the steering wheel actuator.
Figure 7C:
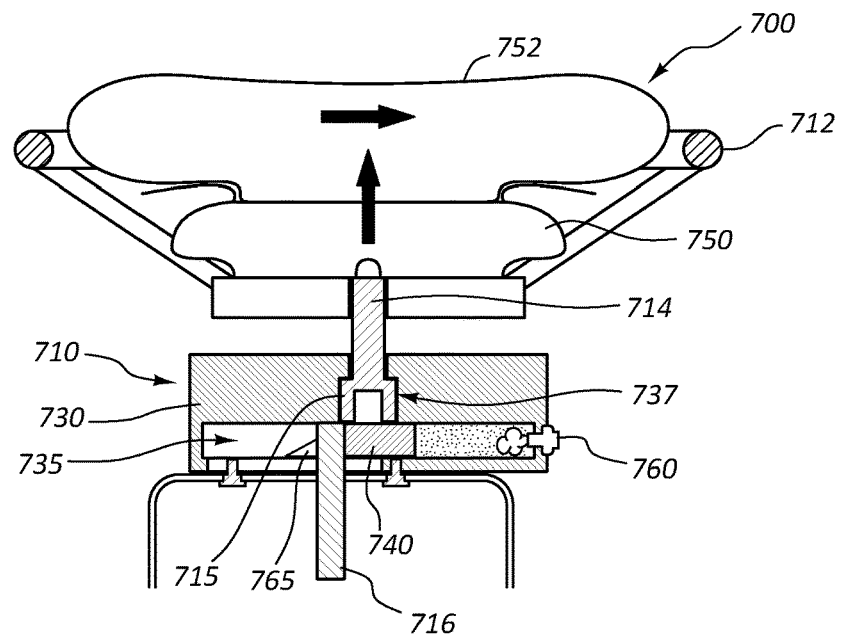
Figure 7D:
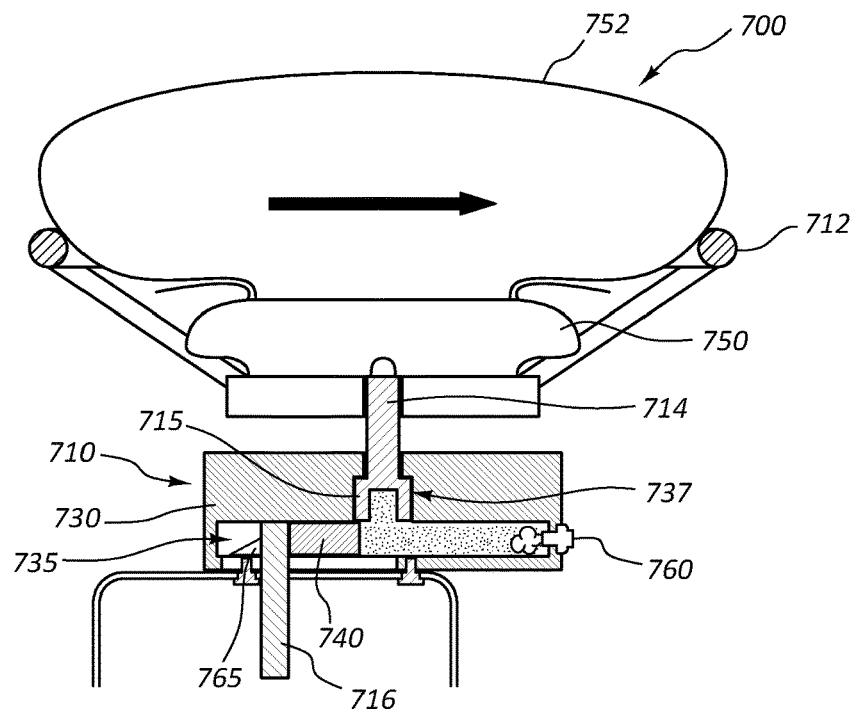
FIG. 7D is a cross-sectional view of the vehicle safety system of FIGS. 7A-7C shown following deployment of the steering wheel actuator.

FIGS. 7A-7D depict still another example of an embodiment of a vehicle safety system 700 comprising a steering wheel actuator 710 and an initiator 760 for initiating steering wheel actuator 710. Once again, initiation of steering wheel actuator 710 results in repositioning of steering wheel 712 between a first, operational configuration and a second, deployed configuration such that an airbag cushion 752 may be deployed from an airbag module 750 at a more preferable location given a particular impact event, such as an oblique angle or lateral impact event. FIG. 7A depicts steering wheel 712 in the first configuration and FIG. 7D depicts steering wheel 712 in the second configuration. FIGS. 7B and 7C depict intermediate stages during the deployment of steering wheel actuator 710.

System 700 comprises a steering wheel shaft 714 coupled with a steering column shaft 716. Steering wheel actuator 710 comprises an actuation housing 730 having a piston chamber 735 within which a piston 740 is slidably received.

An initiator 760, which may comprise a pyrotechnic device, is operably coupled with piston 740 such that, upon deployment of initiator 760, piston 740 is forced towards steering wheel shaft 714 and steering column shaft 716 by the gas generated from initiator 760.

However, steering wheel shaft 714 is configured to be decoupled from steering column shaft 716 and piston 740 is configured to decouple the steering wheel shaft 714 from the steering column shaft 716. More particularly, steering wheel shaft 714 comprises a connector 715 for coupling the steering wheel shaft 714 to the steering column shaft 716. Connector 715 may also be configured to facilitate decoupling of steering wheel shaft 714 from steering column shaft 716.

In the depicted embodiment, piston 740 comprises a ramp structure 765 extending from the end of piston 740 facing shafts 714 and 716. Ramp structure 765 may be forked so as to allow for at least a portion of ramp structure 765 to pass by steering column shaft 716 and engage steering wheel shaft 714 so as to decouple the steering wheel shaft 714 from the steering column shaft 716.

FIG. 7B depicts this initial stage of deployment. As shown in this figure, ramp structure 765 is engaging connector 715 and pushing connector 715, along with steering wheel shaft 714 and steering wheel 712, upwards, as indicated by the arrow in FIG. 7B. The angled shape of ramp structure 765 allows the end of this structure to engage the bottom of connector 715 and provide this upward force. Moreover, as mentioned above, providing a forked structure, or an offset ramped structure, allows for this upward force to be provided while ramp structure passes steering column shaft 716.

A recess 737 may be provided in housing 730 to accommodate connector 715, as also shown in FIG. 7B. In some embodiments, recess 737 may be tapered such that connector 715 is wedged into recess 737 due to the upward force mentioned above. In some such embodiments, the friction fit due to this tapering may lock the steering wheel 712 in place to prevent a driver from turning it following deployment. By providing both a lateral and an upward force, this embodiment may be preferred for certain configurations because it may, under certain circumstances, be preferred to move the airbag cushion towards the driver/occupant in addition to laterally.

As shown in FIG. 7C, once connector 715 has been fully received in recess 737, piston 740 can force steering column shaft 716 out of alignment from steering wheel shaft 714 and thereby force steering wheel 712, airbag module 750, and airbag cushion 752 laterally.

FIG. 7D depicts system 700 following full deployment of steering wheel actuator 710. In this configuration, airbag cushion 752 may be in a better position to provide protection in the event of certain impact events, such as lateral or oblique angle impact events. Although the embodiment depicted in FIGS. 7A-7D shows steering wheel 712 being moved laterally to the right, other embodiments are contemplated in which steering wheel 712 may be configured to be forced to the left, or may be configured to be forced either right or left depending upon the direction of the impact during a lateral impact event, as mentioned above.

Moreover, several of the specific embodiments described herein are configured to translate or move a steering wheel to result in movement of an associated airbag cushion, other embodiments are contemplated in which an airbag module and/or cushion is moved, using one or more of the inventive principles disclosed herein, without necessarily also moving a vehicle steering wheel. Each of the various steering wheel actuators disclosed herein, including actuators 510, 610, and 710, should therefore be considered examples of means for laterally displacing an airbag cushion. Because each of these exemplary actuators is also configured to laterally displace an airbag cushion, they should also be considered examples of means for means for laterally displacing a steering wheel. In addition, each of the initiators disclosed herein should be considered examples of means for deploying a means for laterally displacing an airbag cushion and/or steering wheel.

FIG. 8A is a cross-sectional view of still another embodiment of a vehicle safety system 800 comprising a steering wheel actuator 810 for moving a steering wheel laterally prior to or during an impact event. Vehicle safety system 800 is configured to allow for movement of a steering wheel to the left or right depending upon the direction of an impact and/or other characteristics of an impact event.

More particularly, vehicle safety system 800 comprises a steering wheel actuator 810 that comprises a pulley system made up of a cable 813 extending between opposing pulleys 809a and 809b. Opposing ends of cable 813 are coupled to a steering column shaft 816, which may be positioned in a bearing assembly 817. In some embodiments, cable 813 may be coupled to steering column shaft 816 by a crimping process, or may be coupled using bolts, other fasteners, or any other suitable process and/or coupling means. Thus, in the depicted embodiment, cable 813 is crimped to steering column shaft 816 at coupling points 815a and 815b.

Steering wheel actuator 810 further comprises an actuation housing 830 having a piston chamber 835 within which a piston 840 is slidably received. Two opposing initiators 860a/860b are both operably coupled with piston 840, such that, upon deployment of one initiator, piston 840 is forced in a direction towards the opposite initiator by the gas generated from the respective initiator 860a/b. Thus, deployment of initiator 860a forces piston 840 to the right (from the perspective of FIG. 8A). Similarly, deployment of initiator 860b forces piston 840 to the left, as depicted in FIG. 8B.

Because piston 840 is coupled with cable 813, which is coupled with steering column shaft 816, and thereby coupled with an accompanying steering wheel (not shown), movement of piston 840 in one direction results in movement of steering column shaft 816, and an accompanying steering wheel, in an opposite direction. Of course, a variety of alternative embodiments will be apparent to those of ordinary skill in the art after having received the benefit of this disclosure. For example, cable 813 may be replaced with a band, strap, or other similar means for transmitting force from piston 840 to a steering wheel.

As previously described, for certain impact events, it may be preferred to move the steering wheel, along with an airbag cushion and/or module, laterally in a first direction and, for other impact events, it may be preferred to move the steering wheel in another direction. Thus, initiators 860a and 860b may be configured to be actuated independently upon receipt of particular signals indicative of particular impact events.

FIG. 9 is a cross-sectional view of still yet another embodiment of a vehicle safety system 900. Vehicle safety system 900 is similar to vehicle safety system 700 except that the particular elements used for allowing steering wheel 912 to be displaced in either of two opposing directions are specifically shown. More particularly, vehicle safety system 900 comprises a steering wheel actuator 910 and, like vehicle safety system 800, comprises two opposing initiators 960a and 960b for initiating steering wheel actuator 910. Initiation of steering wheel actuator 910 results in repositioning of steering wheel 912 between a first, operational configuration and a second, deployed configuration such that an airbag cushion may be deployed from an airbag module 950 at a more preferable location given a particular impact event, such as an oblique angle or lateral impact event. FIG. 9 depicts steering wheel 912 in the first configuration and, although the other configurations are not specifically depicted, they may be similar to those depicted in FIGS. 7A-7D, except that, depending upon which initiator is deployed, steering wheel 912 may be either moved to the right or to the left.

System 900 further comprises a steering wheel shaft 914 coupled with a steering column shaft 916. Steering wheel actuator 910 comprises an actuation housing 930 having a piston chamber 935 within which two opposing pistons 940a and 940b are slidably received. In some embodiments, opposing pistons 940a and 940b may instead be positioned in separate piston chambers if desired.

Initiators 960a and 960b are operably coupled with pistons 940a and 940b, respectively, such that, upon deployment of a respective initiator 960a/b, a respective piston 940a/b is forced towards steering wheel shaft 914 and steering column shaft 916 by the gas generated from the respective initiator.

Like steering wheel shaft 714, steering wheel shaft 914 is further configured to be decoupled from steering column shaft 916 and pistons 940a and/or 940b may be configured to decouple the steering wheel shaft 914 from the steering column shaft 916. More particularly, steering wheel shaft 914 comprises a connector 915 for coupling the steering wheel shaft 914 to the steering column shaft 916, which may also be configured to facilitate decoupling of steering wheel shaft 914 from steering column shaft 916.

In the embodiment depicted in FIG. 9, pistons 940a and 940b each comprises a ramp structure 965a and 965b, respectively. Ramp structures 965a and 965b may be forked so as to allow for at least a portion of the respective ramp structures 965a/b to pass by steering column shaft 916 and engage steering wheel shaft 914 so as to decouple the steering wheel shaft 914 from the steering column shaft 916.

Thus, upon deployment of initiator 960a, piston 940a is forced to the right, ramp structure 965a causes connector 915 to decouple steering wheel shaft 914 from steering column shaft 916 and allows piston 940a to force steering wheel 912 to the right. Similarly, upon deployment of initiator 960b, piston 940b is forced to the left, ramp structure 965b causes connector 915 to decouple steering wheel shaft 914 from steering column shaft 916 and allows piston 940b to force steering wheel 912 to the left.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle safety system, comprising:
a steering wheel configured to be positioned between a first, operational configuration and a second, deployed configuration, wherein the steering wheel is configured to be repositioned between the first configuration and the second configuration at least in part by a translational movement of the steering wheel; and
an airbag cushion deployable from the steering wheel, wherein the steering wheel is configured to automatically move from the first configuration to the second configuration before or during deployment of the airbag cushion.

2. The vehicle safety system of claim 1, wherein in the second configuration the steering wheel is positioned laterally relative to the first configuration.

3. The vehicle safety system of claim 1, wherein the airbag cushion is configured to deploy in either the first configuration or the second configuration to protect a single vehicle occupant.

4. The vehicle safety system of claim 1, further comprising a steering wheel actuator configured to move the steering wheel from the first configuration to the second configuration.

5. The vehicle safety system of claim 4, wherein the steering wheel actuator is configured to reposition the steering wheel in either a first direction or a second direction opposite from the first direction depending upon detected characteristics of an impact event.

6. The vehicle safety system of claim 5, further comprising at least one sensor, wherein the at least one sensor is configured to detect a predetermined characteristic of an impact event and, upon detecting the predetermined characteristic of the impact event, transmit a signal to displace the airbag cushion in either the first direction or the second direction.

7. The vehicle safety system of claim 6, wherein the first direction is towards a driver-side door of a vehicle comprising the vehicle safety system, and wherein the second direction is towards a passenger-side door of the vehicle relative to an initial position of the steering wheel.

8. The vehicle safety system of claim 1, wherein the system is configured such that the steering wheel is operably coupled to wheels of a vehicle comprising the vehicle safety system in both the first and second configurations such that the steering wheel can be used to move wheels of the vehicle in both the first and second configurations.

9. The vehicle safety system of claim 1, wherein the steering wheel is part of a steering wheel assembly, and wherein the steering wheel is further configured to be repositioned between the first configuration and the second configuration at least in part by a pivotal movement of at least one component of the steering wheel assembly.

10. The vehicle safety system of claim 9, wherein the steering wheel is configured to be repositioned between the first configuration and the second configuration at least in part by a pivotal movement of a steering wheel shaft of the steering wheel assembly with respect to a steering column shaft of the steering wheel assembly.

11. The vehicle safety system of claim 10, wherein the steering wheel is further configured to be repositioned between the first configuration and the second configuration at least in part by a tilting movement of the steering wheel.

12. The vehicle safety system of claim 1, wherein the steering wheel is configured to actuate in response to either a detection or prediction of an impact event.

13. A vehicle safety system, comprising:
a steering wheel;
an airbag cushion coupled with the steering wheel; and
means for laterally displacing the airbag cushion in response to either a detection or prediction of an impact event.

14. The vehicle safety system of claim 13, wherein the means for laterally displacing the airbag cushion comprises means for laterally displacing the steering wheel.

15. The vehicle safety system of claim 14, wherein the means for laterally displacing the steering wheel comprises:
a spring; and
a pyrotechnic release mechanism, wherein the pyrotechnic release mechanism is configured to retain the spring in a compressed configuration and, upon actuation of the pyrotechnic release mechanism, release the spring, and wherein, upon release of the spring, the spring is configured to laterally displace the steering wheel.

16. The vehicle safety system of claim 15, wherein the means for laterally displacing the steering wheel further comprises:
a pilot gear; and
a steering wheel shaft gear coupled with the pilot gear, wherein, upon actuation of the pyrotechnic release mechanism, the spring is configured to disengage the steering wheel shaft gear from the pilot gear.

17. The vehicle safety system of claim 14, wherein the means for laterally displacing the steering wheel comprises:
a piston; and
a pyrotechnic device coupled with the piston such that, upon deployment of the pyrotechnic device, the piston forces the steering wheel in a lateral direction.

18. The vehicle safety system of claim 17, further comprising a steering wheel shaft, wherein the piston is configured to decouple the steering wheel shaft from a steering column shaft.

19. The vehicle safety system of claim 18, further comprising a connector for coupling the steering wheel shaft to the steering column shaft, wherein the piston comprises a forked ramp structure, and wherein the forked ramp structure is configured to decouple the steering wheel shaft from the steering column shaft.

20. The vehicle safety system of claim 14, wherein the means for laterally displacing the steering wheel is configured to reposition the steering wheel between a first, operational configuration and a second, deployed configuration, and wherein the means for laterally displacing the steering wheel is further configured to reposition the steering wheel between the first configuration and the second configuration at least in part by a translational movement of the steering wheel.

21. The vehicle safety system of claim 14, wherein the means for laterally displacing the steering wheel is configured to reposition the steering wheel between the first configuration and the second configuration before or during deployment of the airbag cushion.

* * * * *